(12) United States Patent  (10) Patent No.: US 8,338,976 B2
Kazadi  (45) Date of Patent: Dec. 25, 2012

(54) MAGNETICALLY-LEVITATED WIND TURBINE

(76) Inventor: Sanza T. Kazadi, Alhambra, CA (US)

(*) Notice: Subject to any disclaimer, the term of this patent is extended or adjusted under 35 U.S.C. 154(b) by 331 days.

(21) Appl. No.: 12/774,244

(22) Filed: May 5, 2010

(65) Prior Publication Data

US 2010/0213723 A1   Aug. 26, 2010

Related U.S. Application Data

(63) Continuation-in-part of application No. 12/427,751, filed on Apr. 22, 2009, now abandoned.

(51) Int. Cl.
  *F03D 9/00*  (2006.01)
  *H02P 9/04*  (2006.01)

(52) U.S. Cl. ......................................................... 290/44

(58) Field of Classification Search .................... 290/44; 415/2.1, 3.1, 4.2, 4.5
See application file for complete search history.

(56) References Cited

U.S. PATENT DOCUMENTS

| | | | | |
|---|---|---|---|---|
| 4,609,827 A * | 9/1986 | Nepple | ........................... | 290/44 |
| 5,506,459 A * | 4/1996 | Ritts | ............................. | 310/90.5 |
| 5,696,419 A * | 12/1997 | Rakestraw et al. | ........... | 310/268 |
| 6,147,415 A * | 11/2000 | Fukada | ............................ | 290/55 |
| 6,160,336 A * | 12/2000 | Baker et al. | ...................... | 310/74 |
| 6,781,270 B2 * | 8/2004 | Long | ............................. | 310/90.5 |
| 6,831,374 B2 * | 12/2004 | Seki | ................................ | 290/44 |
| 7,462,950 B2 * | 12/2008 | Hu | .................................. | 290/55 |
| 2007/0205854 A1 * | 9/2007 | Kazadi | .......................... | 335/306 |

* cited by examiner

*Primary Examiner* — Julio Gonzalez

(74) *Attorney, Agent, or Firm* — Invent Capture, LLC.; Samuel S. Cho

(57) ABSTRACT

A novel wind turbine configuration utilizes a permanent magnetic male and female levitation support for magnetic levitation. The novel wind turbine has a female part attached to a payload which is magnetically levitated above a male part of the levitation support. The female part and the payload are further operatively attached to a vertical axle structure which is held stationary by a point of contact. The point of contact and the vertical axle structure provide a stable axis of rotation for the payload and the female part, which can be rotated with near-zero friction due to the magnetic repulsion provided by same polarity of the female part and the male part within a conical region of the female part. In one embodiment of the invention, an alternator structure is uniquely arranged to enable the novel wind turbine to generate electricity with a high level of efficiency and durability.

15 Claims, 3 Drawing Sheets

300

MAGNETICALLY-LEVITATED WIND TURBINE

INCORPORATION BY REFERENCE

The present invention by Dr. Sanza Kazadi hereby incorporates by reference all of the contents of his issued U.S. Pat. No. 7,501,922, titled "Permanent Magnetic Male and Female Levitation Supports" which issued on Mar. 10, 2009.

RELATED APPLICATIONS

The present invention claims priority to a U.S. non-provisional application Ser. No. 12/427,751 filed on Apr. 22, 2009. The present invention is also related to an issued U.S. Pat. No. 7,501,922 by the inventor, Dr. Sanza Kazadi.

FIELD OF THE INVENTION

The present relates to the field of energy generation, utilizing wind and an magnetically-levitated apparatus. Furthermore, the present invention generally relates to turbines. More specifically, the invention relates to a novel magnetically-levitated wine turbine using a unique magnetic levitation support as described and patented in U.S. Pat. No. 7,501,922 by Dr. Sanza Kazadi.

BACKGROUND OF THE INVENTION

Wind turbines are rotating devices in the presence of wind and can be used for a variety of purposes. Direct mechanical work performed by wind turbines is applied in manufacturing, farming, and food production industries. Coupling a wind turbine to a generator or alternator provides a renewable source of electricity which does not require fossil fuels or excrete carbon byproducts. A recent surge in oil prices, a continuing trend of global warming due to carbon byproducts from fossil fuel usage, and depleting underground oil reserves have elevated the development for renewable energy to a forefront of energy research.

There are two general classes of wind turbines: horizontal and vertical axis turbines. Horizontal axis wind turbines have a rotational axis parallel to the ground. These turbines must be turned into the wind using a yaw device to obtain maximal torque. Vertical axis wind turbines have a rotational axis perpendicular to the ground, which is exemplified by U.S. Pat. No. 1,076,713, titled "Air or Water Motor". The vertical axis wind turbines do not have yaw devices but can suffer problems associated with excessive rotational speeds and maintenance complexities.

Most wind turbines are supported by one or more bearing assemblies. These assemblies hold a wind turbine in place and allow its rotation while attempting to minimize operational friction of the wind turbine. Nevertheless, friction in a wind turbine is still a significant issue. Operational friction of a wind turbine can limit the useful force available for power generation and typically leads to reduced reliability, which renders the wind turbine at least somewhat ineffective for a durable, uninterrupted power generation.

An example of the industry's needs for reduction of friction is exemplified by U.S. Pat. No. 6,700,216, titled "Magnetically Levitated Windmill", which discloses a turbine generating an electrical current with a set of electromagnets requiring power supplies. These electromagnets provide a magnetic levitation force which disengage physical contacts of support bearings to allow friction-free operation. However, the requirement to supply electrical power to the electromagnets reduce overall operational efficiency of power generation for power delivery, if a wind turbine adapts a design disclosed by this citied art. Furthermore, deactivation of at least some portions of an electromagnetic array due to any electrical or mechanical problems render the electromagnetic array not only inoperable but physically damaging to such a wind turbine design.

Therefore, it may be advantageous to devise a novel magnetically-levitated wind turbine, which exhibits a low to near-zero operational friction and a high level of durability. Therefore, a novel design for a magnetically-levitated wind turbine is presented herein, utilizing permanent magnetic male and female levitation supports (disclosed in U.S. Pat. No. 7,501,922) which was also invented by the applicant of the present invention, Dr. Sanza Kazadi.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an apparatus for a magnetically-levitated wind turbine is disclosed. This apparatus comprises a rigid stationary support structure; a male part of a permanent male and female levitation support, wherein the male part contains permanent magnets; a female part of the permanent male and female levitation support operatively attached to a vertical axle structure and a payload, wherein the female part contains a permanent magnetic region which has an exposed surface with a same magnetic polarity as an upper portion of the male part to create a magnetic repulsion between the male part and the female part for magnetic levitation; and the payload operatively attached to the female part of the vertical axle structure, wherein the payload induces a rotational motion along the vertical axle structure in presence of wind.

Furthermore, in another embodiment of the invention, another apparatus for a magnetically-levitated wind turbine is disclosed. This apparatus comprises a rigid stationary support structure; a male part of a permanent male and female levitation support, wherein the male part contains permanent magnets; a female part of the permanent male and female levitation support operatively attached to a vertical axle structure and a payload, wherein the female part contains a permanent magnetic region which has an exposed surface with a same magnetic polarity as an upper portion of the male part to create a magnetic repulsion between the male part and the female part for magnetic levitation; the payload operatively attached to the female part of the vertical axle structure, wherein the payload induces a rotational motion along the vertical axle structure in presence of wind; and an alternator structure comprising an array of magnets located on or near a support structure which is operatively attached to the female part, and a group of pickup coils nearby the array of magnets, wherein the rotational motion between the array of magnets and the group of pickup coils can produce electricity.

DETAILED DESCRIPTION

Figure 1:
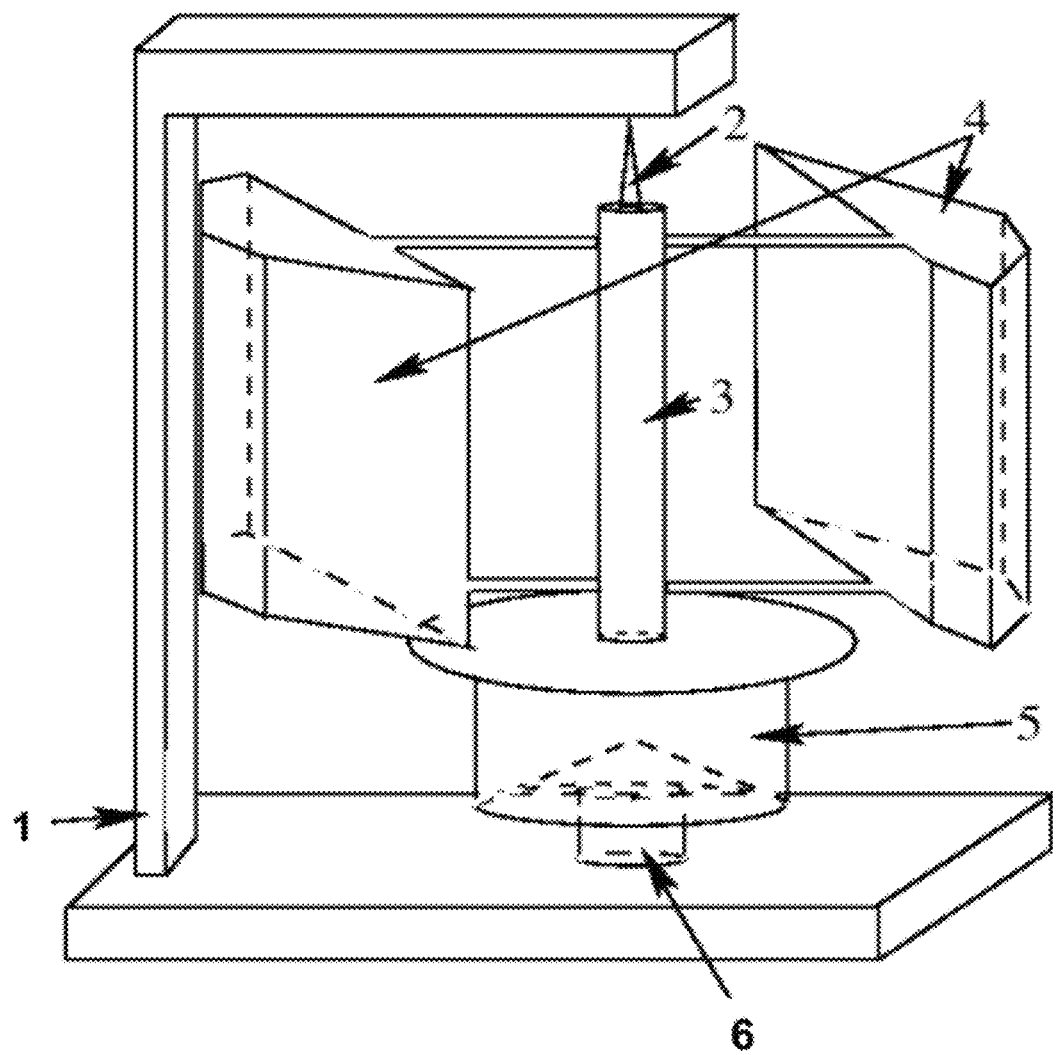
FIG. 1 shows an apparatus for a magnetically-levitated wind turbine, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble apparatuses and/or supports which are associated with or parts of a magnetically-levitated wind turbine. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments.

In general, embodiments of the invention relate to a magnetically-levitated wind turbine. In particular, the invention relates to a novel configuration for a magnetically-levitated wind turbine which utilizes a novel permanent male and female levitation support as patented in U.S. Pat. No. 7,501,922.

One objective of the invention is to create a novel magnetically-levitated wind turbine configuration utilizing a unique arrangement of permanent magnets in a magnetic levitation support, wherein the unique arrangement of permanent magnets in the magnetic levitation support enables low or near-frictionless operation of a wind turbine and superior durability than conventional wind turbines. Another objective of the invention is to provide a novel magnetically-levitated wind turbine which does not require electrical supply to magnets or some rotational motion to a turbine unit for operational stability of a magnetically-levitated wind turbine.

FIG. 1 shows a simplified view of an apparatus for a magnetically-levitated wind turbine (100), in accordance with an embodiment of the invention. In a preferred embodiment of the invention, the magnetically-levitated wind turbine (100) comprises three principle components: a rigid stationary support structure (1), a magnetically-levitated axle structure (2,3,5,6), and a payload (4) supported by magnetic levitation provided by the magnetically-levitated axle structure (2,3,5,6).

Figure 3:
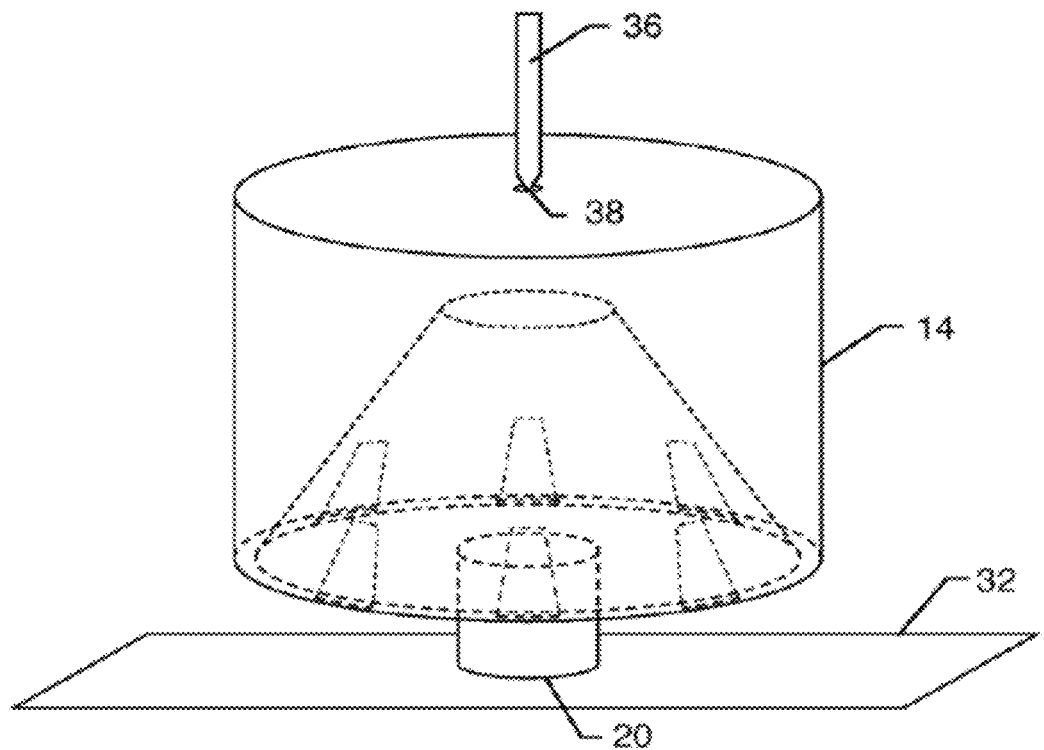
FIG. 3 shows a perspective view of a permanent magnetic male and female levitation support capable of rotating about a pivot point, in accordance with an embodiment of the invention.

In the preferred embodiment of the invention, the rigid stationary support structure (1) is a structure holding a male part ((6) in FIG. 1, (20) in FIG. 3) of a permanent magnetic male and female levitation support (e.g. (5 and 6) of FIG. 1, or (300) of FIG. 3). The permanent magnetic male and female levitation support (e.g. (5 and 6) of FIG. 1, or (300) of FIG. 3) may be rigidly constructed in relation to a remainder of the rigid stationary support structure (1). Furthermore, a contact point (e.g. topmost portion of (2) in FIG. 1, (38) in FIG. 3) of a vertical axle (2) and the vertical axle (2) provides mechanical stability to the magnetically-levitated wind turbine (100) with a payload (4) configured to rotate around a vertical and magnetically-levitated axle structure (2,3,5,6). The topmost portion of the vertical axle (2) may be designed to contact one or more stationary points to enable the vertical axle structure (2,3) to rotate in part or completely around the one or more stationary points.

The permanent magnetic male and female levitation support (e.g. (5 and 6) of FIG. 1, or (300) of FIG. 3) comprises a contact-less magnetically-levitated structure as described in U.S. Pat. No. 7,501,922, which is the applicant's previous invention for a novel magnetic levitation support design. In a preferred embodiment of the invention, a male part (6) of the permanent magnetic male and female levitation support (e.g. (5 and 6) of FIG. 1, or (300) of FIG. 3) is attached to a base unit of the rigid stationary support structure, while a female part (5) holding the payload (4) and a vertical axle structure above (2,3) is magnetically levitated above the male part (6).

Continuing with FIG. 1, the payload (4) is attached to at least part of a vertical axle structure (2,3) which typically supports an entire weight of the payload (4). Furthermore, a design of the payload (4) typically does not impede a rotation of the vertical axle structure (2,3) around a contact point (topmost portion of (2)) to the rigid stationary support structure (1). In one embodiment of the invention, the payload (4) comprises one or more vanes which can induce a rotational motion of the vertical axle structure (2,3) in presence of a constant or somewhat-constant wind source. The magnetically-levitated wind turbine (100) configuration of FIG. 1 can be utilized for mechanical work, or in presence of an alternator structure, such as an embodiment presented in FIG. 2, for generation of electricity.

Figure 2:
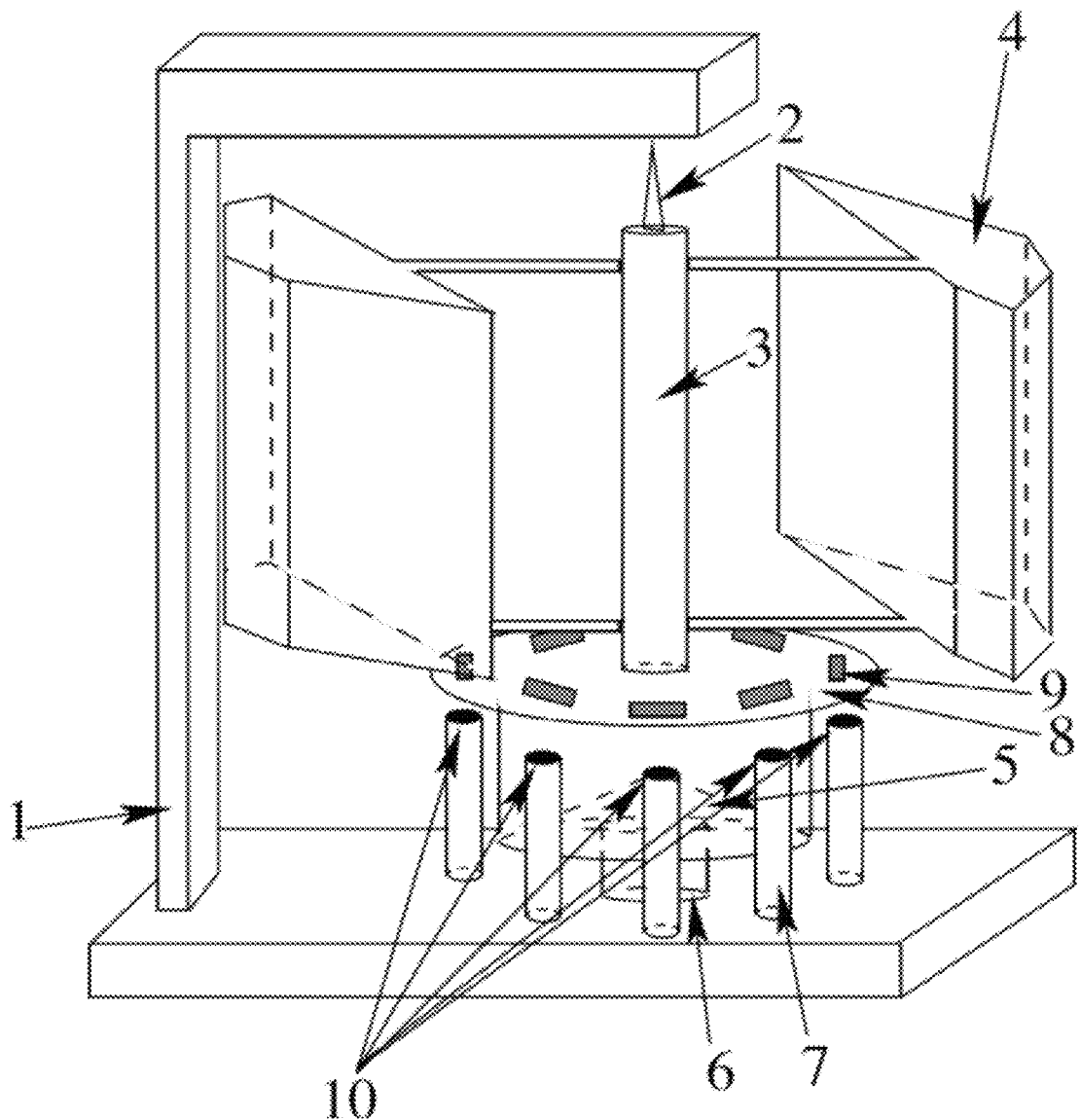
FIG. 2 shows another apparatus for a magnetically-levitated wind turbine with an attached alternator, in accordance with an embodiment of the invention.

FIG. 2 shows another apparatus for a magnetically-levitated wind turbine (200) with an attached "assembly magnetic pickups," or an alternator structure (7,8,9,10), in accordance with another embodiment of the invention. The alternator structure (7,8,9,10) comprises an array of magnets (9) arranged on or near the permanent magnetic male and female levitation support (e.g. (5 and 6) of FIG. 2, or (300) of FIG. 3). In a preferred embodiment of the invention, a group of pickup coils (10) surround the permanent magnetic male and female levitation support (e.g. (5 and 6) of FIG. 2, or (300) of FIG. 3), and an array of magnets (9) are placed on a bottom face of a support structure (8). In one embodiment of the invention, each pickup coil unit in the group of pickup coils (10) has copper or other metallic coils held by a coil support (7). In presence of constant or somewhat-constant wind to a payload (4), the rotating support structure (8) enables the alternator structure (7,8,9,10) to generate electricity by magnetic induction. This alternator structure (7,8,9,10) enables the magnetically-levitated wind turbine (200) to generate electricity with a high-level of efficiency and durability by utilizing a frictionless or near-frictionless permanent magnetic male and female levitation support (e.g. (5 and 6) of FIG. 2, or (300) of FIG. 3).

Furthermore, in a preferred embodiment of the invention, the magnetically-levitated wind turbine (200) also comprises a rigid stationary support structure (1), a magnetically-levitated axle structure (2,3,5,6), and a payload (4) supported by magnetic levitation provided by the magnetically-levitated axle structure (2,3,5,6). In the preferred embodiment of the invention, the rigid stationary support structure (1) is a structure holding a male part ((6) in FIG. 2, (20) in FIG. 3) of a permanent magnetic male and female levitation support (e.g. (5 and 6) of FIG. 2, or (300) of FIG. 3). The permanent magnetic male and female levitation support (e.g. (5 and 6) of FIG. 2, or (300) of FIG. 3) may be rigidly constructed in relation to a remainder of the rigid stationary support structure (1). Furthermore, a contact point (e.g. topmost portion of (2) in FIG. 2, (38) in FIG. 3) of a vertical axle (2) and the vertical axle (2) provides mechanical stability to the magnetically-levitated wind turbine (200) with a payload (4) configured to rotate around a vertical and magnetically-levitated axle structure (2,3,5,6). The topmost portion of the vertical axle (2) may be designed to contact one or more stationary points to enable the vertical axle structure (2,3) to rotate in part or completely around the one or more stationary points.

The permanent magnetic male and female levitation support (e.g. (5 and 6) of FIG. 2, or (300) of FIG. 3) comprises a contact-less magnetically-levitated structure as described in U.S. Pat. No. 7,501,922, which is the applicant's previous invention for a novel magnetic levitation support design. In a preferred embodiment of the invention, a male part (6) of the permanent magnetic male and female levitation support (e.g. (5 and 6) of FIG. 2, or (300) of FIG. 3) is attached to a base unit of the rigid stationary support structure, while a female part (5) holding the payload (4) and a vertical axle structure above (2,3) is magnetically levitated above the male part (6).

Continuing with FIG. 2, the payload (4) is attached to at least part of a vertical axle structure (2,3) which typically supports an entire weight of the payload (4). Furthermore, a design of the payload (4) typically does not impede a rotation of the vertical axle structure (2,3) around a contact point (topmost portion of (2)) to the rigid stationary support structure (1).

FIG. 3 shows a perspective view of a permanent magnetic male and female levitation support (300) capable of rotating about a pivot point (i.e. along a vertical axle (36)), in accordance with an embodiment of the invention. In one embodiment of the invention, a male part (e.g. (20) of FIG. 3, (6) of FIGS. 1 and 2) comprises a magnetic cylindrical structure such as FIG. 5 or FIG. 6 of U.S. Pat. No. 7,501,922. Typically, this male part (20) enables a conical region above to "float" or magnetically-levitate due to a same polarity of magnets attached in an inner surface of the conical region, as shown in perforated lines in FIG. 3. For example, if an upper portion of the male part (20) is North in polarity, the exposed surfaces of the magnets in the inner surface of the conical region may also be North in polarity to enable magnetic levitation of a "female part" (14) above the male part (20).

In a preferred embodiment of the invention, the conical region is part of the female part (14) which may have a shape of a cylindrical drum on an exterior surface. Furthermore, the female part (14) may have one or more vertical axles attached (i.e. (2) and (3) in FIGS. 1 and 2 of the present invention), or may simply be held at a stationary pivoting point using a vertical axle (36) touching a contact point (38), as shown in FIG. 3. In addition, the male part (20) may be attached to a base unit (32), and the female part (14) is free to rotate around a stationary vertical axis provided by the vertical axle (36) and the contact point (38).

FIG. 3 as disclosed in the present invention corresponds to FIG. 9 of U.S. Pat. No. 7,501,922 which is also invented by the applicant. The permanent magnetic male and female levitation support (300) configuration serves as a magnetic levitation mechanism for a novel wind turbine as described in FIG. 1 and FIG. 2 of the present invention. The present invention allows part or all of the weight of a moving portion (e.g. a payload (4), a female part (5), a vertical axle structure (2,3)) to be supported by magnetic fields generated by magnetic repulsion generated by the female part (5) and the male part (6) while a stable vertical axis of rotation is provided by stable magnetic fields inside a conical region and contact points of the vertical axle structure (2,3). This novel configuration of magnetically-levitated turbine is completely or nearly frictionless for the payload (4), while providing a high-level of durability and mechanical efficiency for rotational movement of the payload (4). Furthermore, because permanent magnets used in this wind turbine configuration do not require electrical power, unlike electromagnets of conventional magnetic levitation designs, mechanical durability and power efficiency are improved over the conventional magnetic levitation turbines. Moreover, as shown in FIG. 2 of the present invention, an alternator structure (7,8,9,10 of FIG. 2) can be integrated in a novel arrangement to make the wind turbine of the present invention to generate electricity with a high-level of efficiency and durability.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for a magnetically-levitated wind turbine comprising:
   a rigid stationary support structure;
   a male part of a permanent male and female levitation support, wherein the male part contains permanent magnets;
   a female part of the permanent male and female levitation support operatively attached to a vertical axle structure and a payload, wherein the female part contains a permanent magnetic region which has an exposed surface with a same magnetic polarity as an upper portion of the male part to create a magnetic repulsion between the male part and the female part for magnetic levitation; and
   the payload operatively attached to the female part of the vertical axle structure, wherein the payload induces a rotational motion along the vertical axle structure in presence of wind, and wherein the permanent male and female levitation support provides sufficient lateral stabilization to limit or eliminate the need for a dedicated lateral stabilization bearing for lateral stabilization of the female part and the payload.

2. The apparatus of claim 1, further comprising a point of contact above the vertical axle structure, wherein the point of contact accommodates a stable and stationary axis of rotation for the magnetically-levitated wind turbine.

3. The apparatus of claim 1, further comprising an alternator structure comprising an array of magnets located on or near a support structure which is operatively attached to the female part, and a group of pickup coils nearby the array of magnets, wherein the rotational motion of the array of magnets can induce electrical current in the group of pickup coils by magnetic induction.

4. The apparatus of claim 1, further comprising an alternator structure comprising an array of magnets on a bottom surface of a support structure operatively attached to the female part, and a group of pickup coils underneath the array of magnets, wherein the rotational motion of the array of magnets and the group of pickup coils can produce electricity by magnetic induction.

5. The apparatus of claim 1, wherein the permanent magnetic region of the female part is a conical region.

6. The apparatus of claim 1, wherein the payload is one or more vanes which provide rotational motion around an axis of rotation provided by the vertical axle structure.

7. The apparatus of claim 1, wherein a mechanical energy generated by the magnetically-levitated wind turbine is transferred to a mechanical system such as a belt or a gearing system, which accommodates a mechanical energy transfer from the rotational motion of the vertical axle structure to the mechanical system.

8. The apparatus of claim 3, wherein the group of pickup coils comprise copper coils held by one or more coil supports.

9. The apparatus of claim 3, wherein the alternator structure generates electricity by magnetic induction when the payload rotates around an axis of rotation provided by the vertical axle structure.

10. An apparatus for a magnetically-levitated wind turbine comprising:
   a rigid stationary support structure;
   a male part of a permanent male and female levitation support, wherein the male part contains permanent magnets;
   a female part of the permanent male and female levitation support operatively attached to a vertical axle structure and a payload, wherein the female part contains a permanent magnetic region which has an exposed surface with a same magnetic polarity as an upper portion of the male part to create a magnetic repulsion between the male part and the female part for magnetic levitation;
   the payload operatively attached to the female part of the vertical axle structure, wherein the payload induces a rotational motion along the vertical axle structure in presence of wind, and wherein the permanent male and female levitation support provides sufficient lateral stabilization to limit or eliminate the need for a dedicated lateral stabilization bearing for lateral stabilization of the female part and the payload; and
   an alternator structure comprising an array of magnets located on or near a support structure which is operatively attached to the female part, and a group of pickup coils nearby the array of magnets, wherein the rotational motion of the array of magnets can induce electrical current in the group of pickup coils by magnetic induction.

11. The apparatus of claim 10, further comprising a point of contact above the vertical axle structure, wherein the point of contact accommodates a stable and stationary axis of rotation for the magnetically-levitated wind turbine.

12. The apparatus of claim 10, wherein the permanent magnetic region of the female part is a conical region.

13. The apparatus of claim 10, wherein the payload is one or more vanes which provide rotational motion around an axis of rotation provided by the vertical axle structure.

14. The apparatus of claim 10, wherein a mechanical energy generated by the magnetically-levitated wind turbine is transferred to a mechanical system such as a belt or a gearing system, which accommodates a mechanical energy transfer from the rotational motion of the vertical axle structure to the mechanical system.

15. The apparatus of claim 10, wherein the group of pickup coils comprise copper coils held by one or more coil supports.

* * * * *